United States Patent
Miki

(10) Patent No.: US 11,482,739 B2
(45) Date of Patent: Oct. 25, 2022

(54) BATTERY PACK

(71) Applicant: TOYOTA JIDOSHA KABUSHIKI KAISHA, Toyota (JP)

(72) Inventor: Hironori Miki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 16/737,505

(22) Filed: Jan. 8, 2020

(65) Prior Publication Data

US 2020/0227796 A1 Jul. 16, 2020

(30) Foreign Application Priority Data

Jan. 10, 2019 (JP) .............................. JP2019-002387

(51) Int. Cl.
*H01M 10/613* (2014.01)
*H01M 10/6556* (2014.01)
*H01M 10/625* (2014.01)

(52) U.S. Cl.
CPC ....... *H01M 10/613* (2015.04); *H01M 10/625* (2015.04); *H01M 10/6556* (2015.04); *H01M 2220/20* (2013.01)

(58) Field of Classification Search
CPC ............. H01M 10/613; H01M 10/625; H01M 10/6556; H01M 2220/20; H01M 50/20; H01M 10/482; H01M 10/647; H01M 10/6557; H01M 10/6568; Y02E 60/10
See application file for complete search history.

(56) References Cited

U.S. PATENT DOCUMENTS

| 2018/0194213 A1* | 7/2018 | Kobayashi | ............. B60L 50/66 |
| 2019/0234826 A1* | 8/2019 | Isayev | ........................ G21F 7/00 |
| 2021/0138886 A1* | 5/2021 | Spielvogel | ................ F28F 3/12 |

FOREIGN PATENT DOCUMENTS

| JP | 2014-052116 A | 3/2014 |
| JP | 2014-192044 A | 10/2014 |
| JP | 2018-127087 A | 8/2018 |
| JP | 2018-163741 A | 10/2018 |

\* cited by examiner

*Primary Examiner* — Muhammad S Siddiquee
(74) *Attorney, Agent, or Firm* — Sughrue Mion, PLLC

(57) ABSTRACT

A battery pack of the present disclosure includes at least one battery module, a case that accommodates the battery module, a cooler configured to use a bottom portion of the case including a mounting surface on which the battery module is mounted as a partition, the cooler exchanging heat between the battery module and a coolant through the bottom portion, and a recess formed on the bottom portion so as to be recessed from the mounting surface, the recess surrounding the mounting surface along a pair of side portions and a pair of end wall portions of the case.

7 Claims, 6 Drawing Sheets

BATTERY PACK

CROSS-REFERENCE TO RELATED APPLICATIONS

The present disclosure claims priority to Japanese Patent Application No. 2019-2387 filed on 10 Jan. 2019, which is incorporated herein by reference in its entirety including specification, drawings and claims.

TECHNICAL FIELD

The present disclosure relates to a battery pack that includes at least one battery module and a case that accommodates the battery module.

BACKGROUND

A conventionally known battery module includes a plurality of substantially rectangular battery cells electrically connected each other via a bus bar and the like (as described in, for example, Japanese Patent Application Laid-Open No. 2018-127087). The plurality of battery cells are stacked without gaps in one direction and fixed to an upper surface of a cooler by screws, bolts, adhesives or the like. The cooler is internally provided with a plurality of cooling channels for circulating a coolant along a stacking direction of the battery cells. The cooler is cooled while the coolant flows in the cooling channels along the stacking direction of the battery cells, and the cooled cooler absorbs heat generated from the adjacent battery cells, such that each of battery cells is cooled.

SUMMARY

As described above, the plurality of battery cells (battery modules) are directly mounted on the upper surface of the cooler, such that a weight and a cost may be reduced compared to when the case accommodating the battery modules is fixed to the upper surface of the cooler. However, in the cooler as described above, if a crack or the like occurs between an upper wall portion on which the battery modules are mounted and a side wall, the coolant leaks out to the upper surface of the cooler. When the coolant contacts the battery cell, the battery cell may be overheated due to a current flowing through a closed circuit formed by the leaked coolant and the battery cell.

A main object of the present disclosure is to prevent the coolant leaking from the cooler for cooling the battery module from contacting with the battery module while reducing the weight and cost of the battery pack.

A battery pack of the present disclosure includes at least one battery module and a case that accommodates the battery module. The battery pack includes a cooler configured to use a bottom portion of the case including a mounting surface on which the battery module is mounted as a partition, the cooler exchanging heat between the battery module and a coolant through the bottom portion, and a recess formed on the bottom portion so as to be recessed from the mounting surface, the recess surrounding the mounting surface along a pair of side portions and a pair of end wall portions of the case.

DESCRIPTION OF EMBODIMENTS

The following describes some embodiments of the disclosure with reference to drawings.

Figure 1:
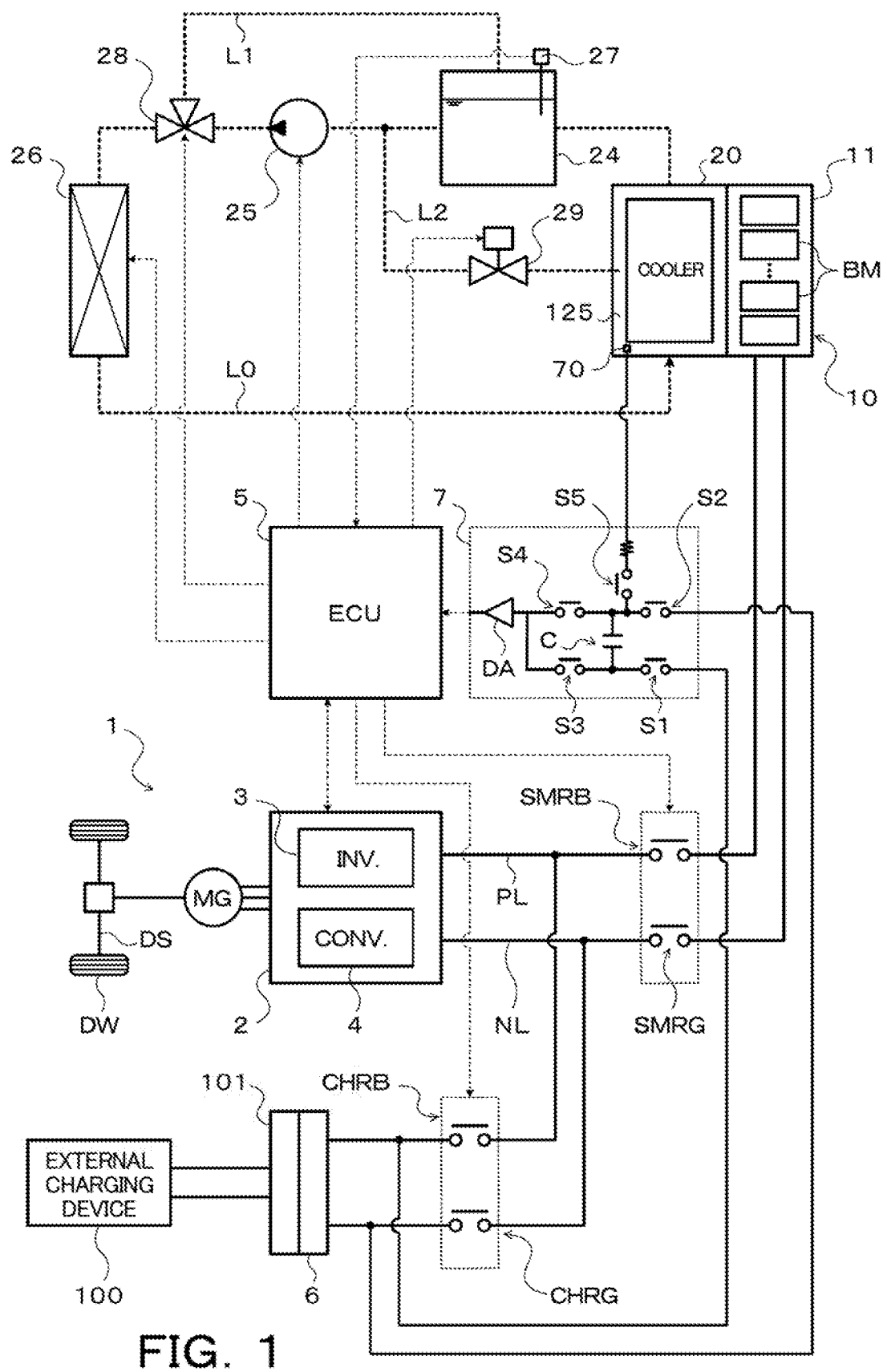
FIG. 1 is a schematic configuration diagram illustrating a vehicle including the battery pack according to the present disclosure.

FIG. 1 is a schematic configuration diagram illustrating an electric vehicle 1 or a vehicle including a battery pack 10 according to the present disclosure. The electric vehicle 1 shown in FIG. 1 includes a power control unit (hereinafter referred to as "PCU") 2 connected to the battery pack 10 via a positive electrode side power line PL and a negative electrode side power line NL, a motor generator (three-phase AC motor) MG connected to the battery pack 10 via the PCU 2, an electronic control unit (hereinafter referred to as "ECU") 5 that controls the PCU 2, and the like in addition to the battery pack 10.

The battery pack 10 includes a plurality of (for example, 48 in the present embodiment) battery modules (battery stacks) BM connected in series, a pack case 11 that accommodates the plurality of battery modules BM, and a cooler 20 that cools the plurality of battery modules BM by heat exchange between each of the battery modules BM and a coolant such as LLC (long life coolant) or the like. In the present embodiment, the battery pack 10 is fixed under a floor of the electric vehicle 1 in the vicinity of rear seats, that is, below a floor panel of the vehicle body (monocoque) by means of bolts or the like.

Figure 2:
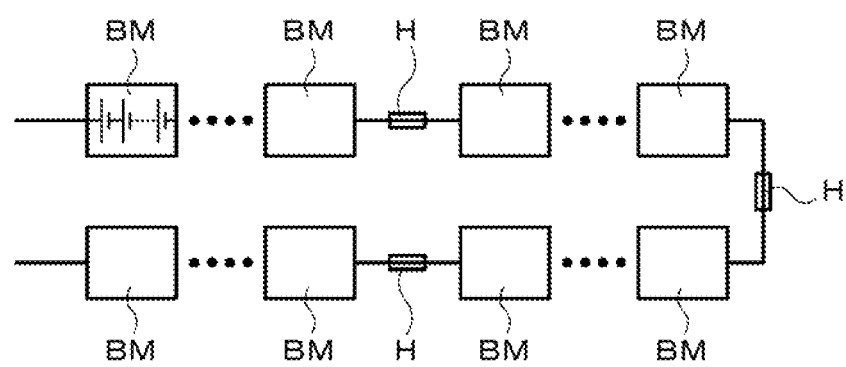
FIG. 2 is a schematic diagram exemplifying a connection mode of the battery modules in the the battery pack according to the present disclosure.

Each battery module BM of the battery pack 10 includes a plurality of battery cells (not shown) connected in series or in parallel. Each battery cell is, for example, a lithium ion secondary battery or a nickel hydrogen secondary battery. The positive electrode side power line PL is connected to a positive electrode terminal of the battery pack 10 via positive electrode side system main relay SMRB. The negative electrode side power line NL is connected to a negative electrode terminal of the battery pack 10 via negative electrode side system main relay SMRG. In the battery pack 10, as shown in FIG. 2, a predetermined number (for example, 6 to 12 in the present embodiment) of the battery modules BM (predetermined number of battery cells) form one unit and a fuse H is installed between the units connected to each other. Each fuse H is a power fuse with a rated current larger than a rated current of the battery pack 10 (the plurality of battery modules BM).

The plurality of battery modules BM of the battery pack 10 can be charged by power from an external charging device 100 such as a charger connected to a household power supply or a quick charger installed on a stand. The electric vehicle 1 includes a power receiving connector 6 capable of being coupled to a power transmission connector 101 of the external charging device 100. The power receiving connector 6 is connected to the positive electrode side power line PL between the positive electrode side system main relay SMRB and PCU 2 via a positive electrode side charge relay CHRB. The power receiving connector 6 is also connected to the negative electrode side power supply line NL between the negative electrode side system main relay SMRG and the PCU 2 via a negative electrode side charge relay CHRG.

Further, the electric vehicle 1 includes an electric leakage detection circuit 7 that detects an electric leakage from the battery pack 10 and the like. The electric leakage detection circuit 7 includes, for example, first to fourth switches S1 to S4 such as photorelays, a capacitor C, and a differential amplifier DA that amplifies and outputs a voltage between terminals of the capacitor C. In the present embodiment, one terminal of the first switch S1 of the electric leakage detection circuit 7 is connected to a power line between the positive electrode side charge relay CHRB and the power receiving connector 6. One terminal of the second switch S2 is connected to the power line between the negative electrode side charge relay CHRG and the power receiving connector 6. The other terminal of the first switch S1 is connected to one terminal of the third switch S3. The other terminal of the third switch S3 is connected to one input terminal of the differential amplifier DA and is grounded via an insulation resistance (not shown). The other terminal of the second switch S2 is connected to one terminal of the fourth switch S4. The other terminal of the fourth switch S4 is connected to the other input terminal of the differential amplifier DA and is grounded via an insulation resistance (not shown). An output terminal of the differential amplifier DA is connected to the ECU 5 via an A/D converter (not shown). The capacitor C is connected to a contact between the first and third switches S1 and S3 and a contact between the second and fourth switches S2 and S4.

The motor generator MG is a synchronous generator motor (three-phase AC motor). A rotor of the motor generator MG is coupled to drive shafts DS respectively connected to a drive wheel DW via a transmission shaft, a gear mechanism including a reduction gear and differential gear. The motor generator MG is driven by electric power from the battery pack 10 so as to output a driving torque to the drive shafts DS. The motor generator MG outputs a regenerative braking torque to the drive shafts DS when the electric vehicle 1 is braked. The PCU 2 includes an inverter (drive circuit) 3 that drives motor generator MG, a boost converter 4 capable of boosting the electric power from battery pack 10 and stepping down a voltage from motor generator MG side, a chargeable and dischargeable capacitor (not shown) and the like.

The ECU 5 is a microcomputer including a CPU, a ROM, a RAM, and the like (not shown). The ECU 5 acquires detection values of a rotational position sensor (not shown) that detects a rotational position of the rotor of motor generator MG, various sensors of the PCU 2, a voltage sensor (not shown) that detects a voltage between terminals of the battery pack 10, a current sensor (not shown) that detects a current flowing through the battery pack 10, and the like. The ECU 5 controls the inverter 3 and the boost converter 4 of the PCU 2 based on the detection values and the like. Further, the ECU 5 controls opening and closing of the positive electrode side system main relay SMRB, the negative electrode side system main relay SMRG, the positive electrode side charge relay CHRB and the negative electrode side charge relay CHRG. The ECU 5 turns on or off the first to fourth switches S1-S4 of the electric leakage detection circuit 7 and determines whether the electric leakage occurs or not based on a signal from the electric leakage detection circuit (differential amplifier DA). Functions of the ECU 5 may be provided by a plurality of electronic control units.

Figure 3:
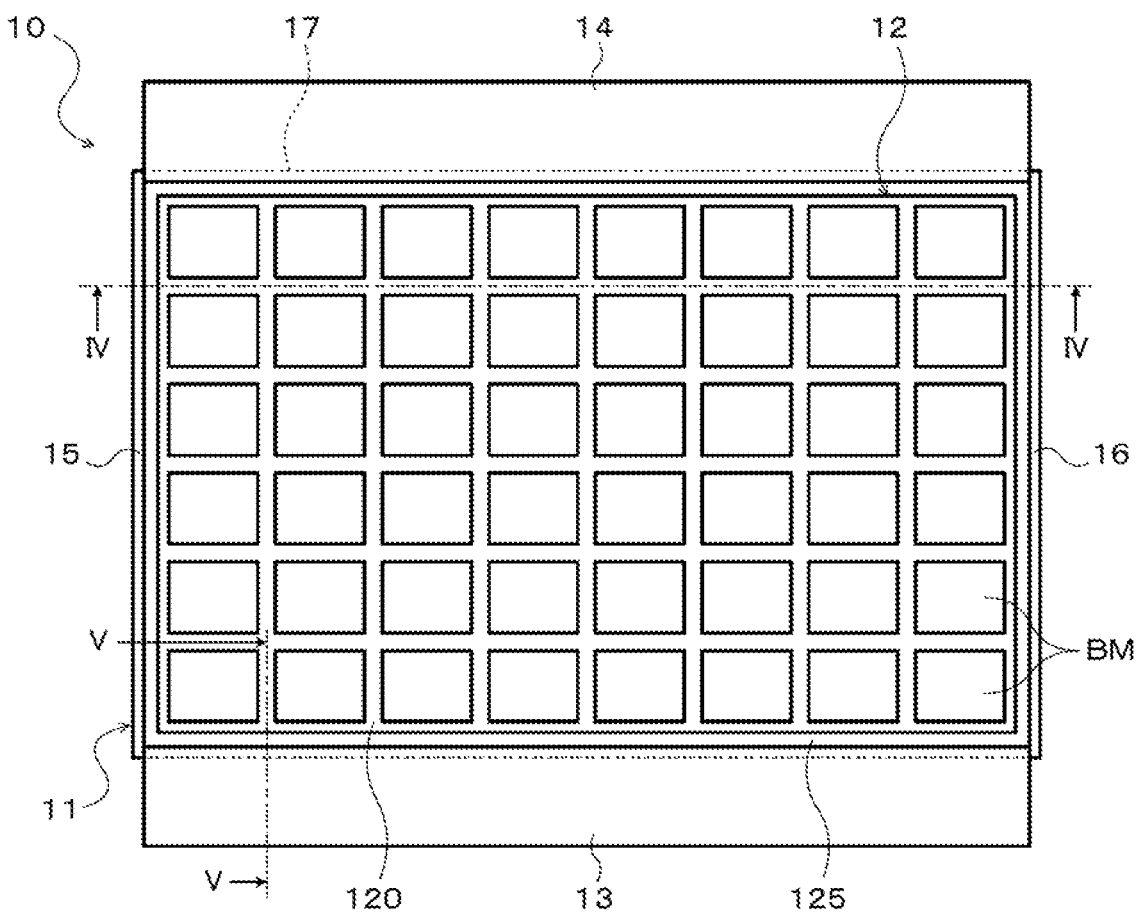
FIG. 3 is a plan view illustrating the battery pack according to the present disclosure.
Figure 4:
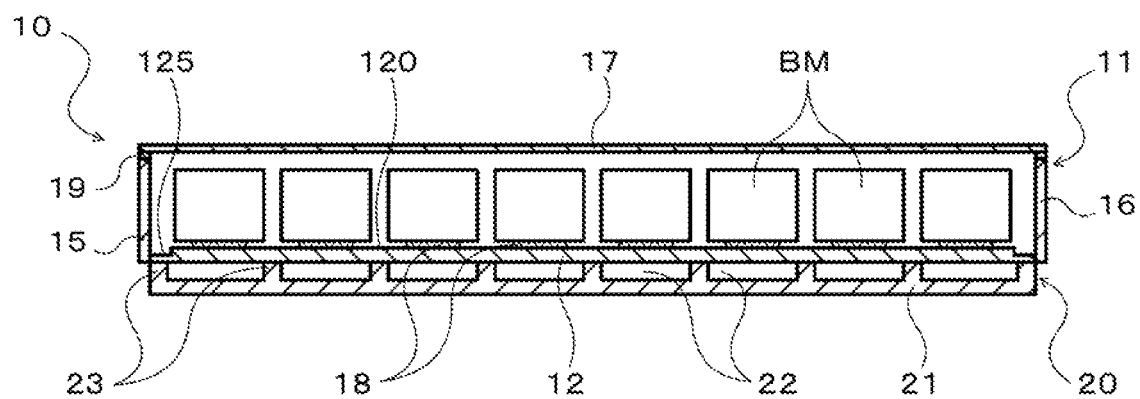
FIG. 4 is a sectional view taken along line IV-IV in FIG. 3.
Figure 5:
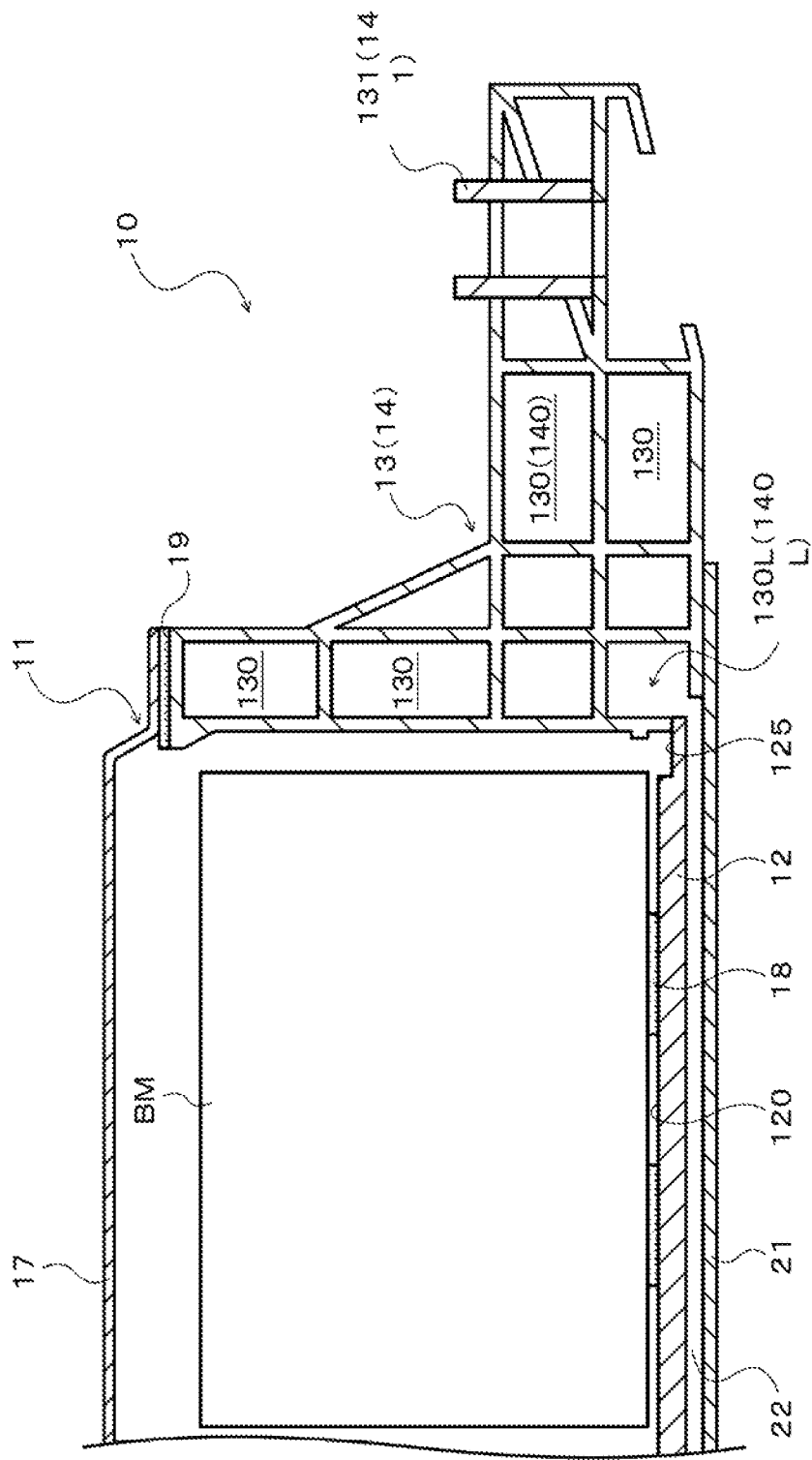
FIG. 5 is a sectional view taken along line V-V in FIG. 4.

FIG. 3 is a plan view illustrating the battery pack 10. FIG. 4 is a sectional view taken along line IV-IV in FIG. 3 and FIG. 5 is a sectional view taken along line V-V in FIG. 4. As shown in these drawings, the pack case 11 of the battery pack 10 includes a bottom portion 12, a pair of side frames (side portions) 13 and 14 respectively extending along a corresponding side of the electric vehicle 1, a front end plate 15 (end wall portion) located on a front side of the electric vehicle 1, a rear end plate (end wall portion) 16 located on a rear side of the electric vehicle 1, and a cover 17. The bottom portion 12, the side frames 13 and 14, the front end plate 15 and the rear end plate 16 of the pack case 11 are all made of metal.

As shown in FIGS. 3 to 5, the bottom portion 12 of the pack case 11 is formed in a flat plate shape. The bottom portion 12 includes a mounting surface 120 on which the plurality of battery modules BM are mounted, and a recess 125 formed around the mounting surface 120. The plurality of battery modules BM are mounted in a matrix on the mounting surface 120 of the bottom portion 12 via a heat transfer sheet 18 and respectively fixed to the bottom portion 12. The recess 125 is recessed from the mounting surface 120 and extends along an outer periphery of the bottom portion 12 so as to surround the mounting surface 120. Further, as shown in FIG. 1, a conductor 70 electrically connected to the above electric leakage detection circuit 7 is fixed (fastened) to the bottom surface of the recess 125. In the present embodiment, the electric leakage detection circuit 7 includes a resistor of which one end is connected to the conductor 70 and a fifth switch S5 of which one terminal is connected to the other end of the resistor. The other terminal of the fifth switch S5 is connected to the contact (ground side) between the second and fourth switches S2 and S4. The fifth switch S5 of the electric leakage detection circuit 7 is also turned on or off by the ECU 5. This configuration enables to determine whether the coolant leaks into the recess 125 or not based on the detection signal from the electric leakage detection circuit 7.

As shown in FIG. 5, the side frames 13 and 14 of the pack case 11 are respectively liquid-tightly joined to an upper surface (upper surface of the recess 125) of a corresponding side edge of the bottom portion 12 by welding. The side frames 13 and 14 respectively include a plurality of hollow portions 130, 140 formed to extend in a front-back direction of the electric vehicle 1 and to work as a so-called crushable zone for absorbing an impact. Further, collars 131 and 141 are fixed to the side frames 13 and 14. A bolt (not shown) for fixing the battery pack 10 to the vehicle body is inserted into each of the collars 131 and 141. The front end plate 15 is liquid-tightly joined to a front end surface of the bottom portion 12 and front end surfaces of the side frames 13 and 14 by welding. The rear end plate 16 is liquid-tightly joined to a rear end surface of the bottom portion 12 and rear end surfaces of the side frames 13 and 14 by welding. Thus, the recess 125 of the bottom portion 12 extends along the pair of side frames 13 and 14, the front end plate 15 and the rear end plate 16. The cover 17 of the pack case 11 is made of metal or resin. The cover 17 is fixed to the side frames 13 and 14, the front end plate 15 and the rear end plate 16 by means of bolts (not shown) or the like. As shown in the drawings, a seal member 19 are disposed between the cover 17, and the side frames 13 and 14, the front end plate 15 and the rear end plate 16.

As shown in FIGS. 3 to 5, the cooler 20 of the battery pack 10 is configured to use the bottom portion 12 of the pack case 11 including the mounting surface 120 on which the battery modules BM are mounted, as an upper partition. The cooler 20 includes an under panel (lower partition) 21 made of metal in addition to the bottom portion 12. As shown in FIG. 4, the under panel 21 includes a plurality of projections 23 that define a plurality of coolant passages 22 extending in a vehicle width direction together with a lower surface of the bottom portion 12 and an upper surface of the under panel 21. An outer peripheral portion of the under panel 21 is liquid-tightly joined to the lower surface of the bottom portion 12 of the pack case 11 and lower surfaces of the side frames 13 and 14 by welding.

As shown in FIG. 1, a coolant circulation passage L0 is connected to the cooler 20, that is, the plurality of coolant passages 22. The coolant circulation passage L0 is configured to include a coolant tank 24 that stores the coolant, a coolant pump 25 that sucks the coolant from the coolant tank 24 and circulates the coolant in the coolant circulation passage L0, that is, between the cooler 20 and the coolant tank 24, and a cooling device 26 that cools the coolant discharged from the coolant pump 25 between the coolant pump 25 and the cooler 20. In the present embodiment, at least a portion of the coolant circulation passage L0 is formed by the hollow portions 130L and 140L (see FIG. 5) formed in the side frames 13 and 14 of the pack case 11.

The coolant tank 24 includes a level gauge 27 that detects a coolant level and transmits a signal indicating a detection value to the above ECU 5. The coolant tank 24 is fixed to either the vehicle body of the electric vehicle 1 or the pack case 11. Further, the coolant pump 25 is controlled by the ECU 5. That is, the ECU 5 operates or stops the coolant pump 25 in accordance with a detection value (battery temperature T) of a temperature sensor (not shown) installed in the pack case 11 of the battery pack 10 (in a housing space of the battery module BM) or attached to any battery module BM. The cooling device 26 is, for example, an air-cooled radiator, or a heat exchanger (chiller) that shares a refrigerant with an air conditioning device that performs air conditioning of an interior of the electric vehicle 1. An operation of the cooling device 26 (an operation of fan or a supply of the refrigerant) is controlled by the ECU 5.

The coolant circulation passage L0 further includes a three-way valve 28 disposed between the coolant pump 25 and the cooling device 26, a first bypass passage L1, and a second bypass passage L2. An inlet of the three-way valve 28 communicates with a discharge port of the coolant pump 25. A first outlet of the three-way valve 28 communicates with a coolant inlet of the cooling device 26. A second outlet of the three-way valve 28 is connected to one end of the first bypass passage L1. The other end of the first bypass passage L1 communicates with an inside of the coolant tank 24. The second bypass passage L2 includes an on-off valve 29 halfway. One end of the second bypass passage L2 communicates with a suction port of the coolant pump 25. The other end of the second bypass passage L2 communicates with the recess 125 of the bottom portion 12 of the pack case 11. In the present embodiment, the ECU 5 controls switching of the three-way valve 28 and ON/OFF of the on-off valve 29. The coolant pump 25, the cooling device 26, the three-way valve 28, and the on-off valve 29 may be controlled by a dedicated electronic control unit that exchanges information with the ECU 5.

As described above, the cooler 20 of the battery pack 10 of the present disclosure uses the bottom portion 12 of the pack case 11 including the mounting surface 120 on which the plurality of battery modules BM are mounted as the upper partition. The cooler 20 exchanges heat between each battery module BM and the coolant via the bottom portion 12. This configuration reduces a weight and a cost of the battery pack 10 compared to when the pack case 11 accommodating the battery modules BM is fixed to an upper surface of a cooler including a dedicated upper partition wall.

Further, the recess 125 is formed on the bottom portion 12 of the pack case 11 so as to be recessed from the mounting surface 120 of the battery modules BM and surrounds the mounting surface 120 along the pair of side portions 13, 14, the front end plate 15 and the rear end plate 16 of the pack case 11. Even if a crack or a hole due to deterioration such as corrosion occurs in a welded portion between the bottom portion 12 and the side frames 13 and 14 or a welded portion between the bottom portion 12 and the front end plate 15 or the rear end plate 16, this configuration enables the coolant leaking from the crack and the like to be stored in the recess 125 and prevents the coolant from contacting with the battery module BM on the mounting surface 120. Accordingly, the battery pack 10 prevents the coolant leaking from the cooler 20 (the plurality of coolant passages 22) for cooling the plurality of battery modules BM from contacting with each battery module BM while reducing the weight and cost of the battery pack 10.

In the present embodiment, a volume of the recess 125 is defined to cause a level change detectable by the level gauge 27 in the coolant tank 24 before the coolant leaking from the cooler 20 overflows the recess 125 even when the electric vehicle 1 is inclined in the front-back direction and/or the vehicle width direction. This configuration enables to accurately determine whether the coolant leaks into the recess 125 or not based on the detection value of the level gauge 27 of the coolant tank 24 before the coolant leaking from the cooler 20 overflows the recess 125.

The coolant circulation passage L0 includes the three-way valve 28 disposed between the discharge port of the coolant pump 25 and the cooling device 26 (cooler 20), the first bypass passage L1 connected to the three-way valve 28 and the coolant tank 24, and the second bypass passage L2 that includes the on-off valve 29 and is connected to the suction port of the coolant pump 25 and the recess 125 of the bottom portion 12. This configuration enables the coolant to be sucked from the recess 125 by the coolant pump 25 and to be returned to the coolant tank 24 by switching a state of the three-way valve 28 so as to communicate the discharge port of the coolant pump 25 with the first bypass passage L1 and opening the on-off valve 29. Further, in the present embodiment, at least the portion of the coolant circulation passage L0 is formed by the hollow portions 130L, 140L formed in the side frames 13 and 14 of the pack case 11 for absorbing the impact. This configuration reduces an occupied space of the coolant circulation passage L0 while protecting the plurality of battery modules BM.

Figure 6:
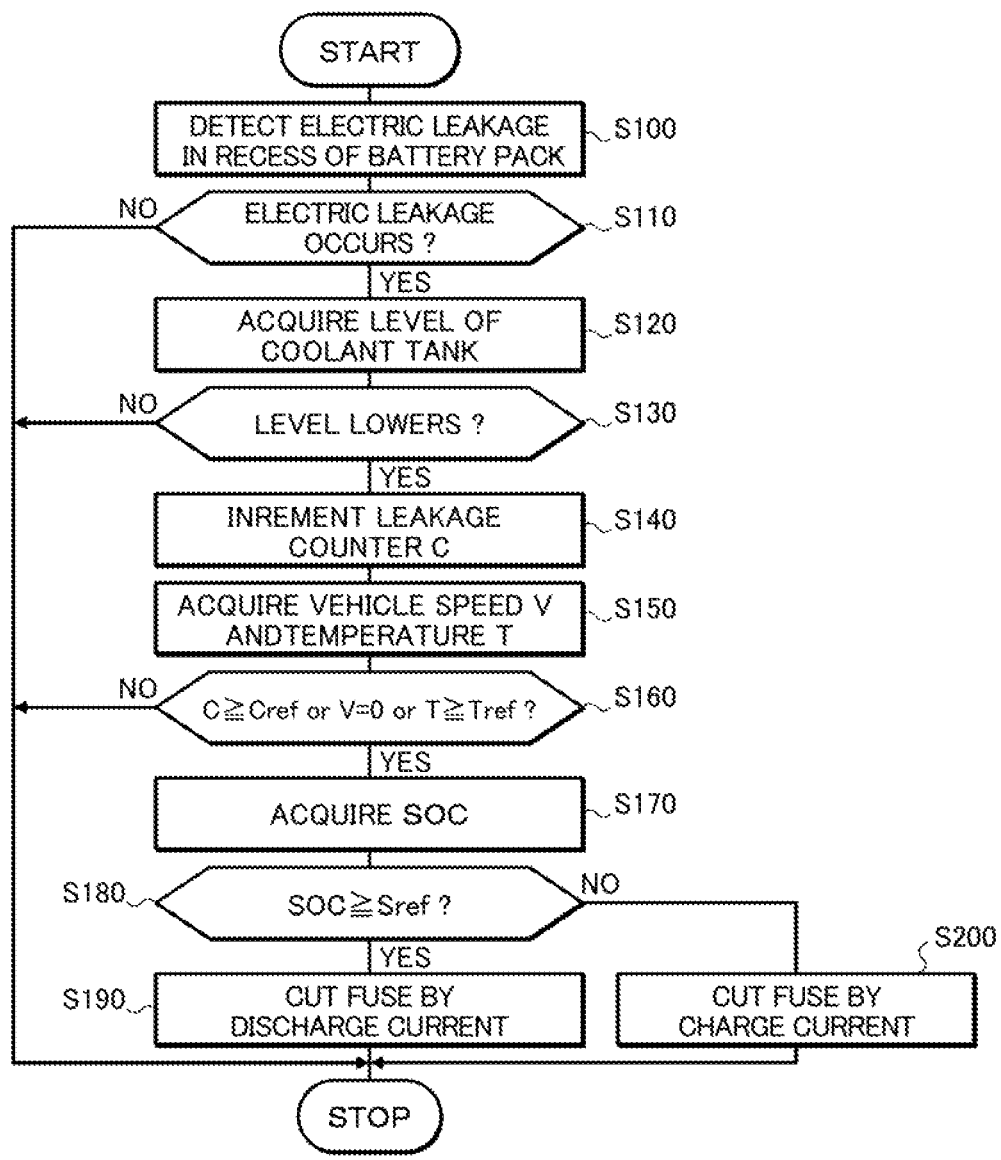
FIG. 6 is a flowchart exemplifying a routine executed to suppress overheating of the battery module when the coolant leaks from the cooler in the battery pack according to the present disclosure.

The following describes a procedure to suppress overheating of each battery module BM when the coolant leaks from the cooler 20 in the battery pack 10 with reference to FIG. 6.

FIG. 6 is a flow chart showing an example of a routine executed by the ECU 5 at predetermined time intervals to suppress overheating of each battery module BM when the coolant leaks from the cooler 20. When a start timing of the routine of FIG. 6 arrives, the ECU 5 turns on and off the fifth switch S5 and the like of the electric leakage detection circuit 7 so as to detect the electric leakage in the recess 125 of the battery pack 10 (Step S100), and determines whether the electric leakage occurs or not based on the signal from the electric leakage detection circuit 7 (Step S110). When determining that the electric leakage does not occur in the recess 125 (Step S110: NO), the ECU 5 terminates the routine at the time and executes the routine again when a next execution timing arrives.

When determining that the electric leakage occurs in the recess 125 (Step S110: YES), the ECU 5 acquires the level of the coolant tank 24 detected by the level gauge 27 (Step S120) and determines whether the acquired level is less than a predetermined threshold value or not (step S130). When determining that the level is equal to or larger than the threshold value (Step S130: NO), the ECU 5 terminates the routine at the time and executes the routine again when the next execution timing arrives. On the other hand, when determining that the level is less than the threshold value (Step S130: YES), the ECU 5 increments an leakage counter C (step S140) and acquires a vehicle speed V of the electric vehicle 1 and the battery temperature T detected by the temperature sensor of the battery pack 10 (Step S150).

Further, the ECU 5 determines whether the leakage counter C is equal to or larger than a predetermined threshold value Cref (for example, an integer of 2 or more), or the vehicle speed V is zero, or the battery temperature T is equal to or higher than a predetermined threshold value Tref (Step S160). When determined that the leakage counter C is less than the threshold value Cref, the vehicle speed V is not zero, and the battery temperature T is lower than the threshold value Tref (Step S160: NO), the ECU 5 terminates the routine at the time and executes the routine again when a next execution timing arrives.

When determining that the leakage counter C is equal to or larger than threshold value Cref, or the vehicle speed V is zero, or the battery temperature T is equal to or higher than the threshold value Tref (Step S160: YES), the ECU 5 acquires SOC (charging rate) of the battery pack 10 that is separately calculated (Step S170) and determines whether the SOC is equal to or larger than a predetermined threshold value Sref (Step S180). When determining that the SOC is equal to or larger than the threshold value Sref (Step S180: YES), the ECU 5 controls the PCU 2 such that a current (discharge current) larger than the rated current of the fuse H instantaneously flows by discharging the plurality of battery modules BM (Step S190) and terminates the routine. In this case, electric charges from the plurality of battery modules BM are stored in the capacitor of the PCU 2. When a clutch is disposed between the motor generator MG and the drive shafts DS, electric power from the plurality of battery modules BM may be consumed by the motor generator MG after the clutch is released. On the other hand, when determining that the SOC is less than the threshold value Sref (Step S180: NO), the ECU 5 controls the PCU 2 such that a current (charge current) larger than the rated current of the fuse H instantaneously flows by discharging the capacitor of the PCU 2 (Step S200) and terminates the routine. These processes enable each fuse H to be cut so as to prevent formation of a closed circuit including the battery module BM and the leaked coolant. As a result, overheating of the battery modules BM is satisfactorily suppressed even if the coolant leaks from the cooler 20.

As described above, the battery pack 10 of the present disclosure is configured to include at least one battery module BM and the pack case 11 that accommodates the battery module BM, the cooler 20 configured to use the bottom portion 12 of the pack case 11 including the mounting surface 120 on which the battery module BM is mounted as the partition, the cooler 20 exchanging heat between the battery module BM and the coolant through the bottom portion 12, and the recess 125 formed on the bottom portion 12 so as to be recessed from the mounting surface 120, the recess 125 surrounding the mounting surface 120 along the pair of side frames 13 and 14, the front end plate 15 and the rear end plate 16 of the pack case 11. Thus, the battery pack 10 prevents the coolant leaking from the cooler 20 for cooling the battery module BM from contacting with the battery module BM while reducing the weight and cost of the battery pack 10.

Of course, the above battery pack 10 may be mounted on a hybrid vehicle. Further, instead of the above-described fuse H, an explosive fuse such as a pyrofuse may be adapted. In this case, the explosive fuse may be ignited to separate the adjacent units from each other when an affirmative determination is made in Step S160 of FIG. 6. In the battery pack 10, at least any or all of the side frames 13, 14, the front end plate 15 and the rear end plate 16 may be integrally formed with the bottom portion 12. Furthermore, the electric vehicle 1 may be provided with a coolant receiver located below the battery pack 10 or the cooler 20 and the battery pack 10 may be provided with a discharge port that communicates with the recess 125 and is opened above the coolant receiver, a lid member (flap) capable of opening and closing the discharge port, and a drive mechanism that opens and closes the lid member. This configuration enables the coolant leaking into the recess 125 to flow out to the coolant receiver by opening the lid member by the drive mechanism such that the coolant is stored in the coolant receiver.

Figure 7:
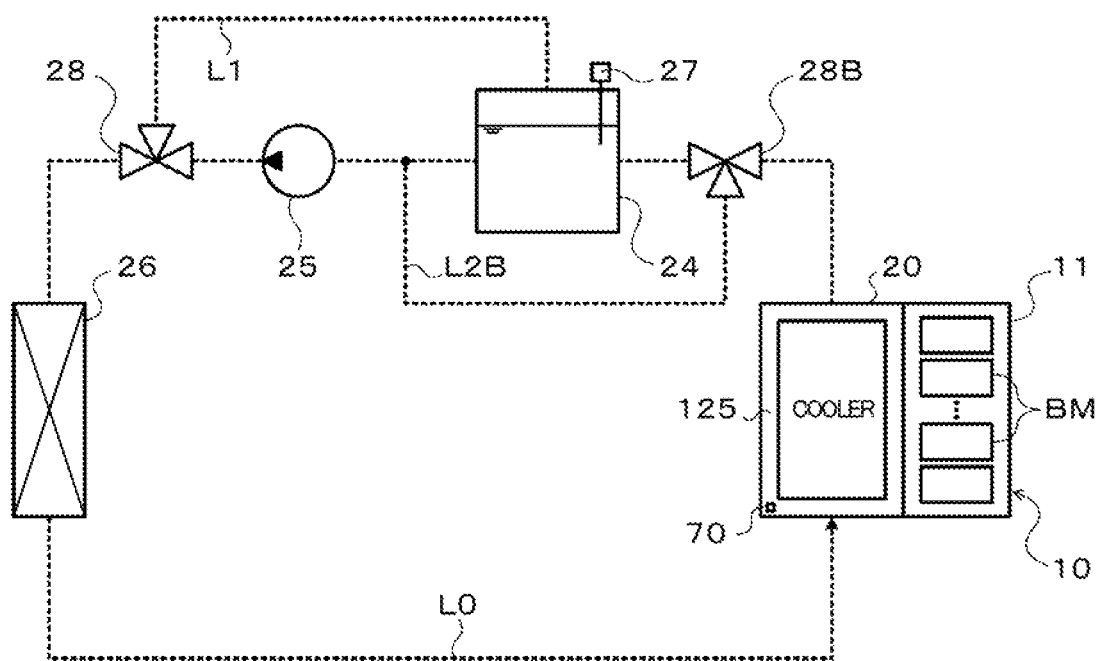
FIG. 7 is a schematic configuration diagram illustrating another coolant circulation passage connected to the cooler of the battery pack according to the present disclosure.

As shown in FIG. 7, the coolant circulation passage L0 may include a second three-way valve 28B and a second bypass passage L2B instead of the above second bypass passage L2. An inlet of the second three-way valve 28B communicates with a coolant outlet of the cooler 20 (the plurality of coolant passages 22) and a first outlet of the second three-way valve 28B communicates with a coolant inlet of the coolant tank 24 as shown in FIG. 7. A second outlet of the second three-way valve 28B is connected to one end of the second bypass passage L2B and the other end of the second bypass passage L2B is connected to the coolant circulation passage L0 between the coolant tank 24 and the suction port of the coolant pump 25. This configuration enables the coolant to be sucked from the recess 125 via the cooler 20 (the plurality of coolant passages 22) by the coolant pump 25 and to be returned to the coolant tank 24 by switching a state of the second three-way valve 28B so as to communicate the coolant outlet of the cooler 20 with the suction port of the coolant pump 25 via the second bypass passage L2B.

As has been described above, a battery pack of the present disclosure includes at least one battery module and a case that accommodates the battery module. The battery pack includes a cooler configured to use a bottom portion of the case including a mounting surface on which the battery module is mounted as a partition, the cooler exchanging heat between the battery module and a coolant through the bottom portion, and a recess formed on the bottom portion so as to be recessed from the mounting surface, the recess surrounding the mounting surface along a pair of side portions and a pair of end wall portions of the case.

The cooler of the battery pack of the present disclosure uses the bottom portion of the case including the mounting surface on which the battery module is mounted as the partition. The cooler exchanges heat between the battery module and the coolant through the bottom portion. This configuration reduces a weight and a cost of the battery pack compared to when the case accommodating the battery modules is fixed to an upper surface (partition) or the like of the cooler. Further, the recess is formed on the bottom portion of the case so as to be recessed from the mounting surface of the battery module and surrounds the mounting surface along the pair of side portions and the pair of end wall portions of the case. This configuration enables the coolant leaking from the crack or the like to be stored in the recess and prevents the coolant from contacting with the battery module on the mounting surface even if the crack or the like occurs between the bottom portion and the side portion and/or between the bottom portion and the end wall portion. Accordingly, the battery pack of the present disclosure prevents the coolant leaking from the cooler for cooling the battery module from contacting with the battery module while reducing the weight and cost of the battery pack.

At least one of the pair of side portions and the pair of end wall portions of the case may be welded to the bottom portion. That is, the invention of the present disclosure is advantageous to the battery pack in which at least one of the side portions and the end wall portions of the case is welded to the bottom portion and the crack or the like may occur in a welded portion due to deterioration or the like.

The cooler may be connected to a coolant circulation passage configured to include a coolant tank that includes a level gauge and stores the coolant, and a coolant pump that pumps the coolant. A volume of the recess may be defined to cause a level change detectable by the level gauge before the coolant leaking from the cooler overflows the recess. This configuration enables to accurately determine whether the coolant leaks into the recess or not based on a detection value of the level gauge of the coolant tank before the coolant leaking from the cooler overflows the recess.

The pair of side portions of the case may respectively include a plurality of hollow portions for absorbing an impact. At least a portion of the coolant circulation passage may be formed by at least one of the plurality of hollow portions. This configuration reduces an occupied space of the coolant circulation passage while protecting the battery module.

The coolant circulation passage may include a three-way valve disposed between a discharge port of the coolant pump and the cooler, a first bypass passage connected to the three-way valve and the coolant tank, and a second bypass passage that includes an on-off valve and is connected to a suction port of the coolant pump and the recess of the cooler. This configuration enables the coolant to be circulated between the coolant tank and the cooler by the coolant pump and enables the coolant to be sucked from the recess by the coolant pump and to be returned to the coolant tank by switching states of the three-way valve and the on-off valve.

The coolant circulation passage may include a first three-way valve disposed between a discharge port of the coolant pump and the cooler, a first bypass passage connected to the first three-way valve and the coolant tank, a second three-way valve disposed between the coolant tank and the cooler, and a second bypass passage connected to the second three-way valve and a suction port of the coolant pump. This configuration enables the coolant to be circulated between the coolant tank and the cooler by the coolant pump and enables the coolant to be sucked from the recess by the coolant pump and to be returned to the coolant tank by switching states of the first and second three-way valves.

The battery pack may further include a conductor disposed in the recess and connected to an electric leakage detection circuit. This configuration enables to determine whether the coolant leaks into the recess or not based on a detection signal from the electric leakage detection circuit.

The battery pack may be configured to include a plurality of the battery modules connected in series. A predetermined number of the battery modules may form one unit. A fuse may be installed between the units connected to each other. In the battery pack, a rated current of the fuse is set larger than a rated current of the battery pack, and a current larger than the rated current of the fuse is supplied to the plurality of battery modules when the coolant leaks into the recess. This enables the fuse to be cut so as to prevent formation of a closed circuit including the battery module and the leaked coolant. As a result, overheating of the battery modules is satisfactorily suppressed even if the coolant leaks from the cooler.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the battery pack.

The invention claimed is:

1. A battery pack that includes at least one battery module and a case that accommodates the battery module, the battery pack comprising:
    a cooler configured to use a bottom portion of the case including a mounting surface on which the battery module is mounted as a partition, the cooler exchanging heat between the battery module and a coolant through the bottom portion,
    a coolant circulation passage configured to include the cooler, a coolant tank that includes a level gauge and stores the coolant, and a coolant pump that sucks the coolant from the coolant tank and circulates the coolant between the coolant tank and the cooler, and
    a recess formed on the bottom portion so as to be recessed from the mounting surface, the recess surrounding the mounting surface along a pair of side portions and a pair of end wall portions of the case, a volume of the recess being defined to cause a level change detectable by the level gauge before the coolant leaking from the cooler overflows the recess.

2. The battery pack according to claim 1,
    wherein at least one of the pair of side portions and the pair of end wall portions of the case is welded to the bottom portion.

3. The battery pack according to claim 1,
    wherein the pair of side portions of the case respectively include a plurality of hollow portions for absorbing an impact, and
    wherein at least a portion of the coolant circulation passage is formed by at least one of the plurality of hollow portions.

4. The battery pack according to claim 1,
    wherein the coolant circulation passage includes a three-way valve disposed between a discharge port of the coolant pump and the cooler, a first bypass passage connected to the three-way valve and the coolant tank, and a second bypass passage that includes an on-off valve, the second bypass passage connected to a suction port of the coolant pump and the recess of the cooler.

5. The battery pack according to claim 1,
wherein the coolant circulation passage includes a first three-way valve disposed between a discharge port of the coolant pump and the cooler, a first bypass passage connected to the first three-way valve and the coolant tank, a second three-way valve disposed between the coolant tank and the cooler, and a second bypass passage connected to the second three-way valve and a suction port of the coolant pump.

6. The battery pack according to claim 1, further comprising:
a conductor disposed in the recess and connected to an electric leakage detection circuit.

7. The battery pack according to claim 1,
wherein the battery pack configured to include a plurality of the battery modules connected in series,
wherein a predetermined number of the battery modules form one unit, and
wherein a fuse is installed between the units connected to each other.

* * * * *